(12) United States Patent
Thorson (10) Patent No.: US 9,738,355 B1
(45) Date of Patent: Aug. 22, 2017

(54) WATERCRAFT WITH CONTROLLABLE IMAGING DEVICE

(71) Applicant: SONY CORPORATION, Tokyo (JP)

(72) Inventor: Brad Thorson, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 15/041,869

(22) Filed: Feb. 11, 2016

(51) Int. Cl.
  *B63B 35/71* (2006.01)
  *H04W 84/12* (2009.01)

(52) U.S. Cl.
  CPC ........ *B63B 35/71* (2013.01); *B63B 2035/715* (2013.01); *B63B 2201/26* (2013.01); *B63B 2211/00* (2013.01); *H04W 84/12* (2013.01)

(58) Field of Classification Search
  CPC .................................................... B63B 35/71
  USPC ........................................................ 441/135
  See application file for complete search history.

(56) References Cited

U.S. PATENT DOCUMENTS

| | | | | |
|---|---|---|---|---|
| 4,553,494 A * | 11/1985 | Constantinescu | ....... | B63C 11/49 114/66 |
| 6,964,243 B1 * | 11/2005 | Thompson | .............. | B63B 35/71 114/347 |
| 7,484,468 B2 * | 2/2009 | Russell | ..................... | B63B 1/10 114/123 |
| 8,014,656 B2 | 9/2011 | Woodman | | |
| 8,290,636 B2 * | 10/2012 | Manning | ................ | A63C 17/12 340/870.07 |
| 8,755,683 B2 | 6/2014 | Biesse | | |
| 2006/0035545 A1 * | 2/2006 | Boley | ..................... | B63C 11/49 441/135 |
| 2011/0297070 A1 | 12/2011 | Riggs et al. | | |
| 2014/0267743 A1 | 9/2014 | Tapia et al. | | |

OTHER PUBLICATIONS

Gopro, "Gopro announces 4K Hero5 Black, Silver, and Hero Cameras", Retrieved on Sep. 29, 2014, pp. 4 Available at: http://vrworld.com/2014/09/29/gopro-announces-4k-hero4-black-silver-hero-cameras/.

* cited by examiner

*Primary Examiner* — Lars A Olson
*Assistant Examiner* — Jovon Hayes
(74) *Attorney, Agent, or Firm* — Chip Law Group (57) ABSTRACT

Various aspects of a watercraft with a controllable imaging device are disclosed herein. The watercraft includes a rotatable housing provided in a recess located underneath the watercraft. The recess further includes a roller assembly to movably engage the rotatable housing within the recess. An imaging device is positioned within the rotatable housing. One or more control commands are received by the imaging device from an electronic device to enable capture of one or more images.

20 Claims, 7 Drawing Sheets

WATERCRAFT WITH CONTROLLABLE IMAGING DEVICE

CROSS-REFERENCE TO RELATED APPLICATIONS/INCORPORATION BY REFERENCE

None.

FIELD

Various embodiments of the disclosure relate to a watercraft. More specifically, various embodiments of the disclosure relate to a watercraft with a controllable imaging device.

BACKGROUND

In recent years, the use of watercraft has become very popular in watersports, such as surfing, stand-up paddle boarding, rafting, kayaking, water skiing, and/or snorkeling. In certain scenarios, while performing a watersport-related activity, a user may also desire to view underwater objects, such as underwater flora and fauna. However, it may be difficult for the user to efficiently perform both activities simultaneously. The user may miss interesting moments or views of one or more underwater objects during the watersport-related activity. Thus, an unabated or seamless experience may not be provided during performance of watersport-related activities.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A watercraft with a controllable imaging device is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed watercraft. Exemplary aspects of the disclosure may include a watercraft that may include a rotatable housing provided in a recess located underneath the watercraft. A roller assembly may be positioned within the recess to movably engage the rotatable housing within the recess. An imaging device may be positioned within the rotatable housing. The imaging device may receive one or more control commands from an electronic device to enable capture of one or more images.

In accordance with an embodiment, the watercraft may correspond to a stand-up paddle board, a surfboard, a kayak, a jet ski, a boat, and/or other watercraft. The imaging device may be positioned within the rotatable housing, such that the imaging device may be partially submerged in the water when the watercraft moves on the water. The imaging device may include one or more circuits at a first end and one or more optical lenses at a second end of the imaging device. The one of more circuits may be positioned above water level. The one or more optical lenses may remain submerged in the water when the watercraft moves on the water.

In accordance with an embodiment, the electronic device may correspond to a tablet computer, a wearable device, a smartphone, a display device, and/or other electronic devices. In accordance with an embodiment, the watercraft may include another recess provided (or incurved) in an upper surface of the watercraft. The electronic device may be movably attached to the other recess by use of a fastener.

In accordance with an embodiment, the one or more images and/or one or more video streams of one or more views underneath the watercraft may be captured The capture of the one or more images and/or the one or more video streams of the one or more views may be in one or more directions. The capture of the one or more images and/or one or more video streams may be based on the received one of more control commands from the electronic device.

In accordance with an embodiment, the captured one of more images and/or video streams may be communicated by the imaging device to an electronic device, via a wireless communication channel. The electronic device may be configured to detect a scene-of-interest from a live video streamed from the imaging device, based on preset user-preferences. In accordance with an embodiment, the one or more control commands may be communicated from the electronic device to the imaging device for the capture of the one or more images of the detected scene-of-interest, or to record a video of the detected scene-of-interest.

In accordance with an embodiment, the electronic device may be configured to control the display of a live video streamed from the imaging device. In accordance with an embodiment, the one or more control commands are communicated from the electronic device to the imaging device for the capture of the one or more images based on a user input. The watercraft may include one or more light straps removably attached to an outer surface underneath the watercraft to provide underwater light. The one or more light straps, the imaging device, and the electronic device may be powered by a battery.

In accordance with an embodiment, the rotatable housing may be floatable. The rotatable housing may be a watertight transparent housing. In accordance with an embodiment, the electronic device may be configured to communicate with one or more other electronic devices of one or more other watercrafts in vicinity of the watercraft.

In accordance with an embodiment, the electronic device may be configured to communicate a first control instruction to the one or more circuits in the imaging device. The first control instruction may correspond to the one or more commands communicated to enable control of a capture mode, a focal length, and/or other camera parameters of the imaging device. The electronic device may be further configured to communicate a second control instruction. The second control instruction may correspond to the one or more commands communicated to the imaging device. The second control instruction may be communicated to enable the mechanical movement of the imaging device to change a direction of a field-of-view of the imaging device.

In accordance with an embodiment, the electronic device may be further configured to detect an abnormality (or abnormalities) in the health condo of a user based on sensor data. The sensor data may be received from one or more wearable devices communicatively coupled to the electronic device. The electronic device may be further figured to communicate an alert to one or more other electronic devices of one or more other watercraft in vicinity to the watercraft. The alert may be, based on the detected abnormality in the health condition of the user. The electronic device may be further configured to generate a digital souvenir, based on the captured one or more images.

In accordance with an embodiment, the electric device may further be configured to arrange the captured one or more images in the digital souvenir. The arrangement of the captured one or more images may be based on one or more of a time-of-capture, a location-of-capture, a sequence-of-capture, a time-of-day during capture, a quality parameter, and/or detected, scene-of-interest in the one or more images. The electronic device may be configured to generate a digital souvenir, based on the captured one or more images and a movement profile of the watercraft in a trip.

Figure 1A:
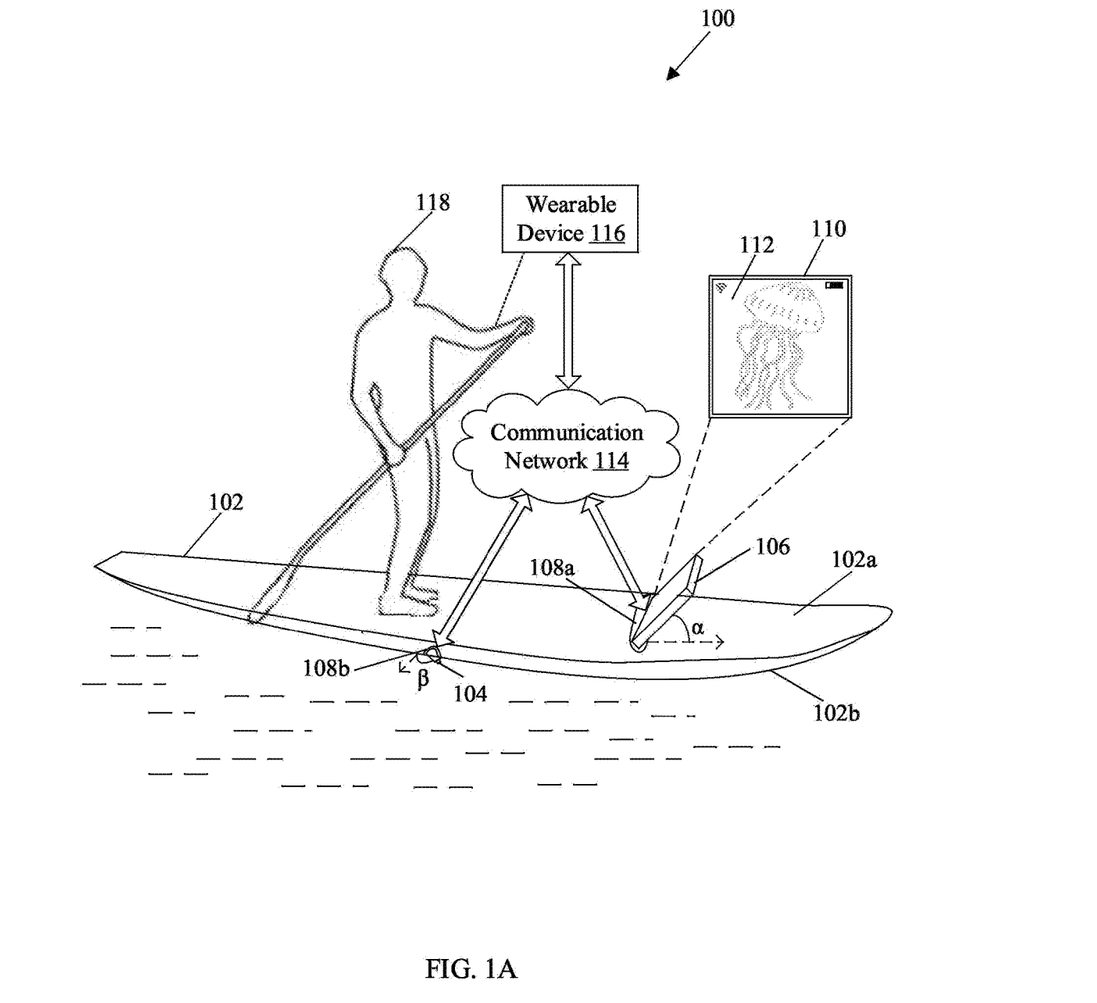
FIG. 1A illustrates a perspective view of an exemplary watercraft in a functional environment, in accordance with an embodiment of the disclosure.

FIG. 1A illustrates a perspective view of an exemplary watercraft in a functional environment 100, in accordance with an embodiment of the disclosure. With reference to FIG. 1A, there is shown a watercraft 102. The watercraft 102 may include an upper surface 102a, a lower surface 102b, an imaging device 104, and an electronic device 106. There is shown one or more recesses 108a and 108b. There is further shown a display 110, a user interface (UI) 112, a communication network 114, a wearable device 116, and a user 118. The UI 112 may be rendered on the display 110 of the electronic device 106.

In accordance with an embodiment, the watercraft 102 may include the recess 108b, which may be incurved at the lower surface 102b of the watercraft 102. In accordance with an embodiment, the imaging device 104 may be positioned within the recess 108b. The electronic device 106 may be positioned at the recess 108a at the upper surface 102a of the watercraft 102. In accordance with an embodiment, the imaging device 104, the electronic device 106, and the wearable device 116 may be communicatively coupled to each other, via communication network 114 (such as Wi-Fi).

The watercraft 102 may be a surface-type watercraft, which may travel on a water surface. Examples of the watercraft 102 may include, but are not limited to, a stand-up paddle board, a surfboard, a kayak, a boat, and/or other surface- or amphibious-type watercraft. The watercraft 102 may be a buoyant body suitable to float on a water surface. In accordance with an embodiment, the upper surface 102a and the lower surface 102b of the watercraft 102 may be made by use of glass-reinforced plastic, fiberglass, wood, polyurethane, polystyrene foam, epoxy resin, polyester, a combination thereof, and/or or other materials.

The imaging device 104 may comprise suitable logic, circuitry, interfaces, and/or code that may be configured to capture one or more images of underwater objects or an underwater environment. Examples of the imaging device 104 may include, but are not limited to, a point-of-view (POV) camera, an action camera, a camcorder, a digital camera, a thermographic camera, and/or a special purpose camera for photography of aquatic creatures and environments.

The electronic device 106 may comprise suitable circuitry and/or interfaces that may be configured to establish a communicative coupling to the imaging device 104, via the communication network 114. The electronic device 106 may be configured to receive one or more images or videos from the imaging device 104. In accordance with an embodiment, the electronic device 106 may be mounted on the recess 108a on the upper surface 102a of the watercraft 102. Examples of the electronic device 106 may include, but are not limited to, a tablet computer, a smartphone, a display device, a wearable device, and/or other electronic device.

The recess 108b may be hollowed out at the lower surface 102b of the watercraft 102. The recess 108b may accommodate various components to enable movement of the imaging device 104 within the recess 108b. The recess 108b may have various shapes. The recess 108b may be a circular-shaped, a triangular-shaped, a U-shaped, a rectangular-shaped, an oval-shaped, and/or a square-shaped recess. The recess 108a may be hollowed out at the upper surface 102a of the watercraft 102, to mount the electronic device 106 (as shown). One end of the electronic device 106 may be movably mounted on the recess 108a. The electronic device 106 may be positioned at the recess 108b, such that the user 118 may view the display of the 110 of the electronic device 106 while performing a watersport activity (as shown).

The display 110 may comprise logic, circuitry, interfaces, and/or code that may be configured to display the one or more images or video streams received from the imaging device 104. Examples of the display 110 may include, but are not limited to, a light-emitting diode (LED), a electroluminescent display (ELD), a plasma display panel (PDP), a liquid crystal display (LCD), an organic light emitting diode display (OLED); a field emission display (FED), a thin film transistor display (TFT), and/or other such displays.

The UI 112 may facilitate the user 118 to interact with one or more applications and/or operating systems of the electronic device 106. One or more images or live video streams may be displayed on the display 110, via the UI 112. In accordance with an embodiment, the UI 112 may include graphical controls, such as a menu bar, a toolbar, a window, a button, and/or other such controls.

The communication network 114 may include a medium through which the imaging device 104, the wearable device 116, and the electronic device 106, may be communicatively coupled to each other. The medium may correspond to a Wireless -Fidelity (Wi-Fi) network, and/or a Light-Fidelity (Li-Fi) network. Notwithstanding, the communication network 114 may also correspond to a Local Area Network (LAN), or a cable wire. Various devices may be operable to connect to the communication network 114. In accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, wireless mess network (WMN), IEEE 802.11, 802.16, IEEE 802.11s, IEEE 802.11g, multi-hop communication, wireless access point (AP), device to device communication, cellular communication protocols, and/or Bluetooth (BT) communication protocols.

The wearable device 116 may comprise logic, circuitry, interfaces, and/or code that may be configured to transmit one or more commands to the electronic device 106 or the imaging device 104, via communication network 114. Example of the wearable device 116 may include, but are not limited to, a smart-band, a smart-watch, and/or a smart-glass. The wearable device 116 may include various sensors, such as a heartbeat sensor, a blood pressure sensor, a respiratory rate sensor, a body temperature sensor, and/or any such sensors.

In accordance with an embodiment, the watercraft 102 may include the recess 108b, which may be hollowed out at the lower surface 102b of the watercraft 102. The imaging device 104 may be movably positioned within the recess 108b. The imaging device 104 may be moved in one or more directions and at various angles, such as an angle "β", as shown. The imaging device 104 may include one or more circuits, such as a transceiver circuit at a first end. The imaging device 104 may include one or more optical lenses at a second end. The imaging device 104 may be positioned within the recess 108b, such that the first end of the imaging device 104 may remain above water level when the watercraft 102 travels on water. The one or more optical lenses at the second end may remain submerged when the watercraft 102 travels on water.

In accordance with an embodiment, the watercraft 102 may include the recess 108a, provided at the upper surface 102a of the watercraft 102. The electronic device 106 may be movably attached to the recess 108b by use of a fastener. In accordance with an embodiment, a tilt angle of the electronic device 106, with respect to the user 118, may be manually adjusted. In accordance with an embodiment, the tilt angle of the electronic device 106 may be adjusted based on a control command received from the wearable device 116. The electronic device 106, the wearable device 116, and the imaging device 104 may be powered by a battery (not shown).

In an implementation, the watercraft 102 may be an elongated buoyant body, such as a stand-up paddle board (SUP). The watercraft 102 may be propelled by a paddle and/or an oar by the user 118. In accordance with an embodiment, the watercraft 102 may include a mechanical propeller system of the kind well-known in the art. The mechanical propeller system may include a motor or an engine to turn a propeller to drive the watercraft 102 on a water surface.

In accordance with an embodiment, the electronic device 106 may be configured to receive an input from the user 118. The input may be received from the wearable device 116 or directly, via the UI 112. Based on the received input, the electronic device 106 may communicate one or more commands to the imaging device 104, via communication network 114 (such as Wi-Fi network). The imaging device 104 may be further configured to capture one or more images or a video underneath the watercraft 102. The capture of the one or more images or the video may occur based on the one or more control commands received from the electronic device 106. The imaging device 104 may be configured to capture the one or more images or the video in one or more directions underneath the watercraft 102.

In accordance with an embodiment, the imaging device 104 may be configured to communicate the captured one or more images or the video to the electronic device 106, via the communication network 114. The electronic device 106 may be configured to control display of the captured one or more images or the video on the display 110, by use of the UI 112. The electronic device 106 may be configured to detect a scene-of-interest from a live video streamed from the imaging device 104.

In accordance with an embodiment, the detection of the scene-of-interest may be based on preset user preferences. The one or more commands may be communicated to the imaging device 104, to capture one or more images of the detected scene-of-interest. The one or more commands may be further communicated to the imaging device 104, to record a video of the detected scene-of-interest. The imaging device 104 may be further configured to communicate the detected scene-of-interest to the electronic device 106. The electronic device 106 may be configured to control display of the detected scene-of-interest on the display 110 of the electronic device 106.

In accordance with an embodiment, the electronic device 106 may be configured to detect an abnormality of abnormalities in the health condition of the user 118. The detected abnormality or abnormalities in the health condition of the user 118 may be based on sensor data received from the wearable device 116 or other wearable devices associated with the user 118. The electronic device 106 may be further configured to generate an alert, based on the detected abnormality or abnormalities in the health condition of the user 118. The electronic device 106 may be further configured to establish a communication with the one or more other electronic devices of one or more other watercraft in vicinity. The electronic device 106 may be further configured to communicate the alert (such as a broadcast) to the one or more other electronic devices of the one or more other watercraft in vicinity with the watercraft 102.

In accordance with an embodiment, the electronic device 106 may be configured to generate a digital souvenir. The digital souvenir may be based on the received captured images or video from the imaging device 104. The electronic device 106 may be further configured to arrange the captured one or more images received from the imaging device 104 within the digital souvenir. The arrangement of the one or more images may be based on one or more factors, such as a time-of-capture, a location-of-capture, a sequence-of-capture, a time-of-day during capture, a quality parameter, and/or detected scene-of-interest. The electronic device 106 may be further configured to generate the digital souvenir based on a movement profile of the watercraft 102 in a trip.

Figure 1B:
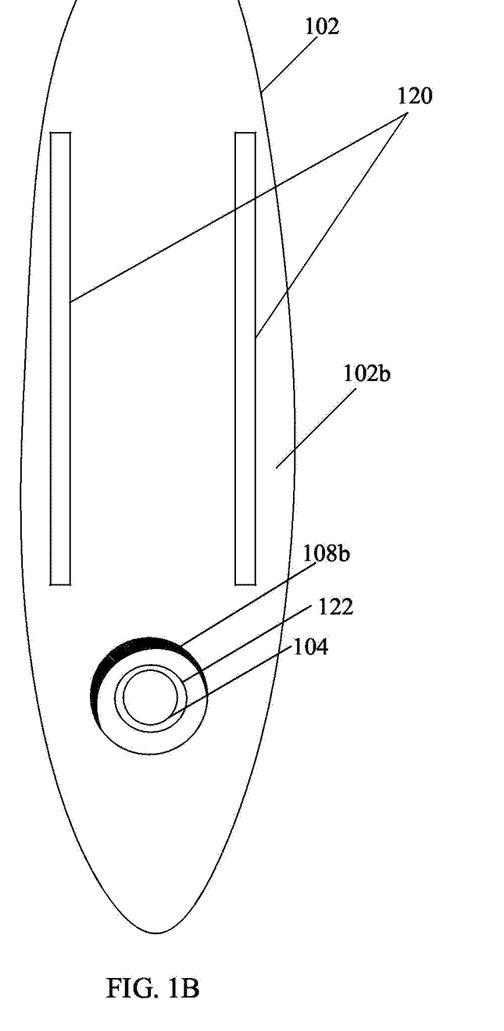
FIG. 1B illustrates a bottom view of an exemplary watercraft, in accordance with an embodiment of to disclosure.

FIG. 1B illustrates a bottom view of an exemplary watercraft, in accordance with an embodiment of the disclosure. FIG. 1B is explained in conjunction with elements from FIG. 1A. With reference to FIG. 1B, there is shown the lower surface 102b of the watercraft 102. There is shown one or more light straps 120, positioned at the lower surface 102b of the watercraft 102. There is further shown a rotatable housing 122, the imaging device 104, and the recess 108b at the lower surface 102b of the watercraft 102. In accordance with an embodiment, the imaging device 104 may be positioned within the rotatable housing 122, provided in the recess 108b. The one or more light straps 120 may be removably attached at the lower surface 102b of the watercraft 102.

The one or more light straps 120 may be configured to produce light. In accordance with an embodiment, the one or more light straps 120 may be attached or detached remotely, based on instructions received from the wearable device 116 or the electronic device 106. The one or more light straps 120 may be used to provide light during a watersport-related activity that may take place in the dark. Examples of the one or more light straps 120 may include, but are not limited to, a light-emitting diode (LED) strip, a miniaturized halogen lamp strip, and/or a special purpose lighting for underwater photography. The one or more light straps 120 may be powered by a battery (not shown).

Figure 1C:
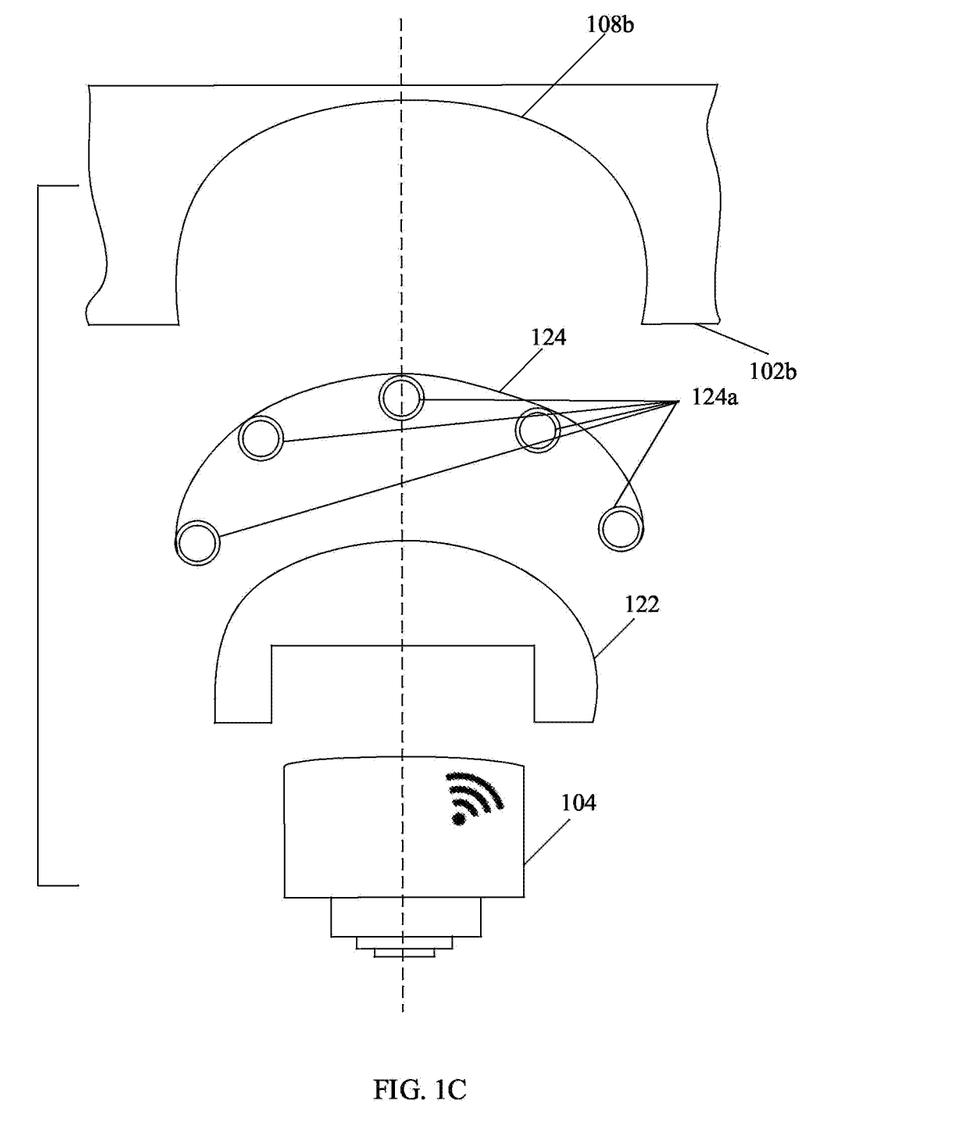
FIG. 1C illustrates an exploded view of various components arranged in an exemplary recess at a lower surface of an exemplary watercraft, in accordance with an embodiment of the disclosure.

The rotatable housing 122 may act as a casing for the imaging device 104. In accordance with an embodiment, the rotatable housing 122 may be a hemispherical structure to hold the imaging device 104 from one end, such as the first end of the imaging device 104 (FIG. 1C). In accordance with an embodiment, the rotatable housing 122 may be a transparent casing made from waterproof material to enclose the imaging device 104. In accordance with an embodiment, the rotatable housing 122 may include a transceiver circuitry and a motor, such as a servo motor or a step motor.

In accordance with an embodiment, instead of the imaging device 104, the transceiver circuitry of the rotatable housing 122 may receive the one or more control commands from the electronic device 106 or the wearable device 116. The rotatable housing 122 may re-position or control movement of the imaging device 104, by use of the received one or more control commands from the electronic device 106 or the wearable device 116. The motor of the rotatable housing 122 may generate discrete or continuous mechanical movement in accordance with the received one or more control commands from the electronic device 106 or the wearable device 116. This may cause the encased imaging device 104 to move in accordance with movement instructions received in the one or more control commands. Alternatively, such transceiver circuitry and the motor may be built into the imaging device 104.

In accordance with an embodiment, the rotatable housing 122, together with the imaging device 104, may be positioned within the recess 108b at the lower surface 102b of the watercraft 102. In accordance with an embodiment, the one or more light straps 120 may generate a high-powered light beam in accordance with an orientation of the imaging device 104. For example, based on the received one or more control commands, the imaging device 104 may be moved to capture a different field-of-view of the underwater environment. Accordingly, a direction of the high-powered light beam may be automatically changed in synchronization with the changed field-of-view or orientation of the imaging device 104. The change in direction of the high-powered light beam may then illuminate the aquatic creatures and environment that may be in the current field-of-view of the imaging device 104. This may enable focused view of certain aquatic creatures or environment lying deep in the underwater environment, which otherwise may not be visible.

FIG. 1C illustrates an exploded view of various components arranged in an exemplary recess provided underneath an exemplary watercraft, in accordance with an embodiment of the disclosure. FIG. 1B is explained in conjunction with elements from FIGS. 1A and 1B. The exploded view of various components may include a portion of the lower surface 102b of the watercraft 102 that surrounds the recess 108b, the imaging device 104, the rotatable housing 122, a roller assembly 124, and a plurality of drive rollers 124a.

The roller assembly 124 may be associated with the plurality of drive rollers 124a. The plurality of drive rollers 124a may rotate the rotatable housing 122 within the recess 108b. The recess 108b may be hollowed out underneath the watercraft 102. Examples of the plurality of drive rollers 124a may include, but are not limited to, feed rollers, pulley rollers, flanged rollers, grooved rollers, nip rollers, pinch rollers, guide rollers, and/or pipe rollers.

In accordance with an embodiment, the roller assembly 124 may be positioned within the recess 108b, to movably engage the rotatable housing 122 within the recess 108b. The imaging device 104, the rotatable housing 122, and the roller assembly 124, may be provided within the recess 108b. The rotatable housing 122 may be in direct contact with the plurality of drive rollers 124a. The roller assembly 124 may be provided to enable mechanical movement of the rotatable housing 122. The imaging device 104 may be positioned within the rotatable housing 122. The mechanical movement of the rotatable housing 122 may further orient or move the imaging device 104, in multiple directions underneath the watercraft 102.

Figure 1D:
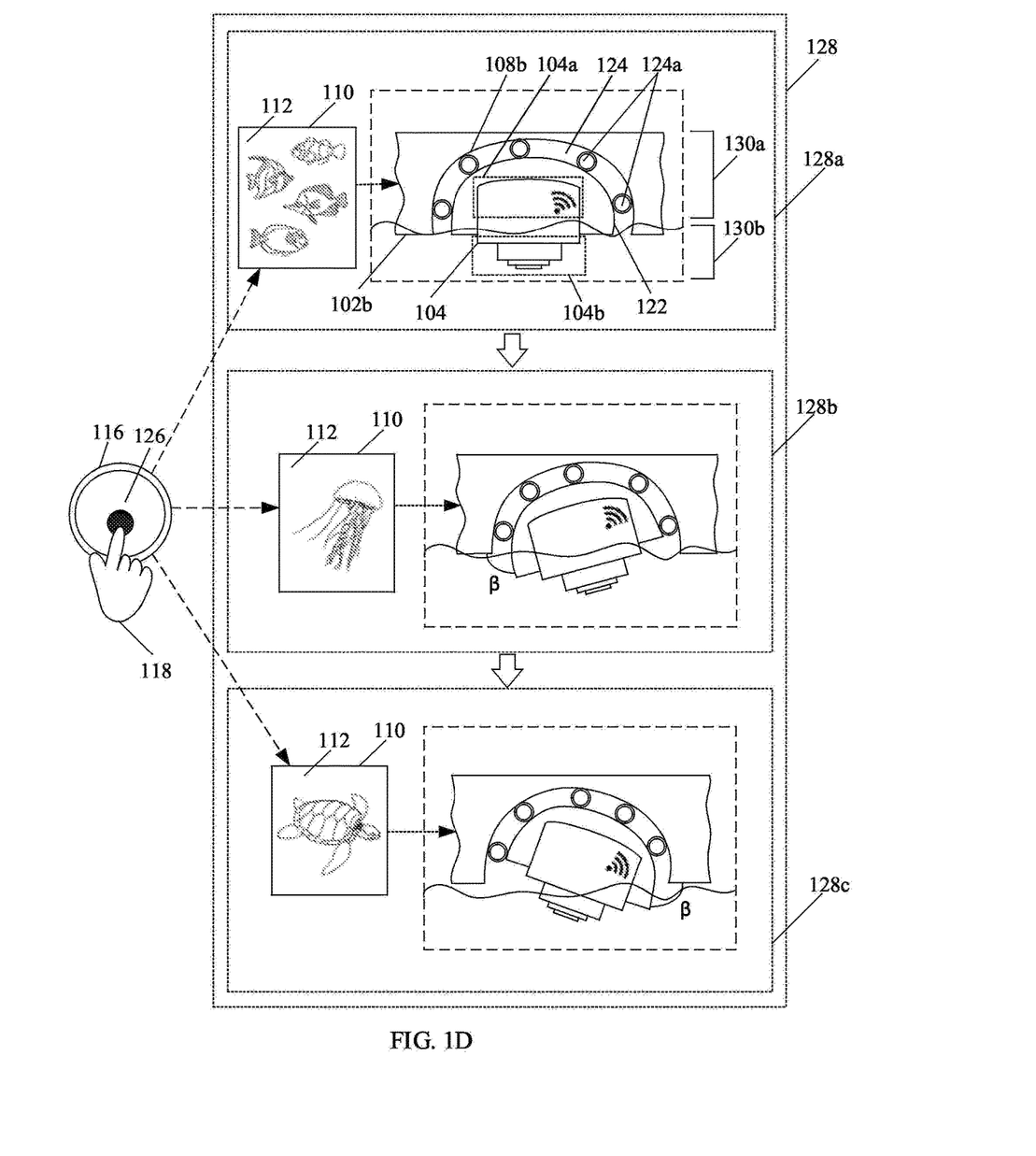
FIG. 1D illustrates the various components of FIG. 1C integrated in the exemplary recess, to depict controlled movement of an exemplary imaging device, in accordance with an embodiment of the disclosure.

FIG. 1D illustrates the various components of the FIG. 1C, integrated in the exemplary recess to depict controlled movement of an exemplary imaging device, in accordance with an embodiment of the disclosure. FIG. 1D is explained in conjunction with elements from FIGS. 1A through 1C. With reference to FIG. 1D there is shown an arrangement 128 of the imaging device 104, to depict controlled movement of the imaging device 104 within the recess 108b. The controlled movement may be depicted by various views 128a to 128c of the components of the FIG. 1C, shown as integrated within the recess 108b. There is further shown the display 110 of the electronic device 106, configured to display one or more images or video via the UI 112 in accordance with an orientation of the imaging device 104, as shown in the views 128a to 128c. There is further shown the wearable device 116 and a UI 126, rendered at the wearable device 116. The UI 126 may facilitate interaction of the user 118 with the wearable device 116. The imaging device 104 may include a first end 104a and a second end 104b. The first end 104a of the imaging device 104 may not be submerged when the watercraft 102 travels on water, as shown by a first portion 130a. The second end 104b may remain submerged or partially submerged in water when the watercraft 102 travels on water, as shown by a second portion 130b.

In accordance with an embodiment, the first end 104a may include the one or more circuits, such as a transceiver circuitry, of the imaging device 104. Accordingly, the one or more circuits may be positioned above the water level, as shown by the first portion 130a. The second end 104b may include the one of more optical lenses of the imaging device 104. Accordingly, the one or more optical lenses of the imaging device 104 may remain submerged or partially submerged in water, as shown by the second portion 130b. Underwater positioning of the imaging device 104 may create signal loss that may block or impact wireless communication, such as a Wi-Fi communication, between the imaging device 104 and the electronic device 106. Hence, the one or more circuits, such as at least the transceiver circuit, may be provided in the first end 104a of the imaging device 104, for seamless communication between the electronic device 106 and the imaging device 104. This may be advantageous to set up wireless communication without hindrances associated with a change in signal communications medium from water to air and vice-versa.

In accordance with an embodiment, the user 118 may provide input via the UI 126 of the wearable device 116, to remotely control mechanical movement or adjust camera parameters of the imaging device 104. The input may correspond to a hands-free voice input, gesture input, or simplified touch input. The input may be entered via a software button of the UI 126 or a hardware button on the wearable device 116. In accordance with an embodiment, the wearable device 116 and the electronic device 106 may be communicatively coupled to each other by use of the Wi-Fi communication protocol in the communication network 114.

With reference to the view 128b of the arrangement 128, there is shown a first movement of imaging device 104, such as from a 90 degree orientation angle (as shown in the view 128a) to +45 degree orientation angle, with respect to the lower surface 102b underneath the watercraft 102. The user 118 may rotate the software button via the UI 126, which in turn may move the imaging device 104 to change the orientation angle of the imaging device 104. The user input may be directly communicated by use of wireless communication to the one or more circuits at first end 104a of the imaging device 104. Alternatively, the user input may be communicated via the electronic device 106. The roller assembly 124 with the plurality of drive rollers 124a may enable stable movement of the imaging device 104. A different view of the underwater environment in accordance with the changed orientation of the imaging device 104 may be rendered on the display 110 of the electronic device 106, via the UI 212.

Similarly, with reference to the view 128c, a second movement of the imaging device 104, such as from +45 degree orientation angle (as shown in the view 128b) to −30 degree orientation angle. The change in angle may be generated with respect to the lower surface 102b, which is underneath the watercraft 102. The user 118 may further rotate the software button via the UI 126, which in turn may cause the imaging device 104 to further change the orientation angle of the imaging device 104. Another view of the underwater environment, in accordance with the changed orientation of the imaging device 104, may be rendered on the display 110 of the electronic device 106, via the UI 212, as shown.

Figure 1E:
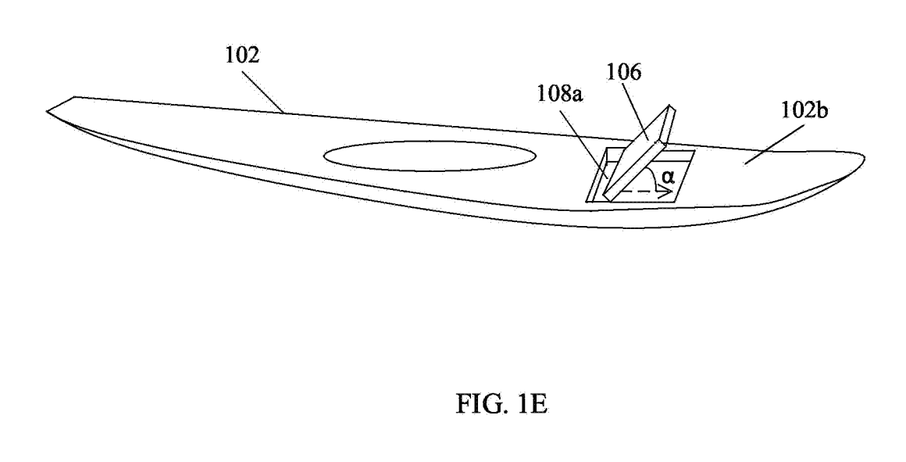
FIG. 1E illustrates an upper surface of an exemplary watercraft, in accordance with an embodiment of the disclosure.

FIG. 1E illustrates an upper surface of an exemplary watercraft, in accordance with an embodiment of the disclosure. FIG. 1E explained in conjunction with elements from FIGS. 1A through 1D. With reference to FIG. 1E, there is shown the upper surface 102a of the watercraft 102, the electronic device 106, the recess 108a, hollowed out at the upper surface 102a of the watercraft 102.

In accordance with an embodiment, the electronic device 106 may be positioned within the recess 108a at the upper surface 102a of the watercraft 102. The electronic device 106 may be associated with a rotatable fastener (not shown). The rotatable fastener may be configured to hold the electronic device 106 at various tilt angles, such as angle "α". The user 118 may manually adjust the tilt of the electronic device 106 at the angle "α" to allow for a convenient view during a watersport-related activity. In accordance with an embodiment, the tilt of the electronic device 106 may be further adjusted based on a control command received from the wearable device 116. The user 118 may further fold or base the electronic device 106 within the recess 108b, when the electronic device 106 is not in use.

Figure 2:
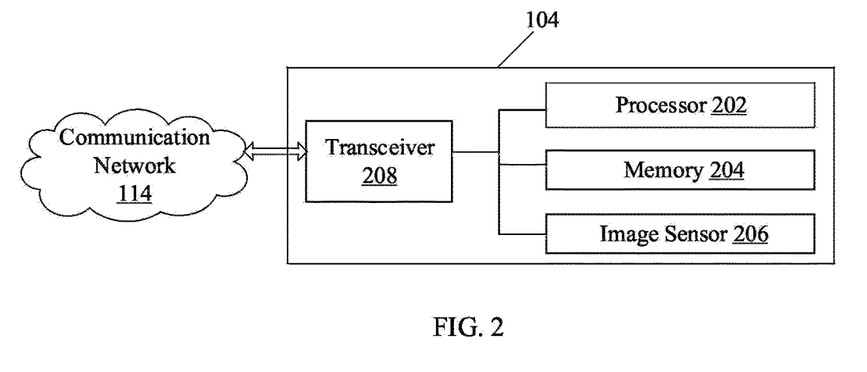
FIG. 2 is a block diagram that illustrates an exemplary imaging device, in accordance with an embodiment of the disclosure.

FIG. 2 is a block diagram that illustrates an exemplary imaging device, in accordance with an embodiment of the disclosure. FIG. 2 is explained in conjunction with elements from FIG. 1A through 1E. With reference to FIG. 2 there is shown the imaging device 104. The imaging device 104 may include one or more processors, such as a processor 202. The imaging device 104 may further include a memory 204, an image sensor 206, and a transceiver 208. The processor 202 may be communicatively coupled to the memory 204, the image sensor 206, and the transceiver 208.

The processor 202 may comprise suitable logic, circuitry, interfaces, and/or code that may be configured to process one or more commands received from the electronic device 106, or the wearable device 116. Examples of the processor 202 may be an X86-based processor, a Reduced Instruction Set Computing (RISC) processor, an Application-Specific Integrated Circuit (ASIC) processor, an Advanced RISC Machines (ARM) processor, a Complex Instruction Set Computing (CISC) processor, and/or other processors.

The memory 204 may comprise suitable logic, circuitry, and/or interfaces that may be configured to store a set of instructions executable by the processor 202. The memory 204 may be further operable to store operating systems and associated applications. Examples of implementation of the memory 204 may include, but are not limited to, Random Access Memory (RAM), Read Only Memory (ROM), Dynamic Random Access Memory (DRAM), Static Random Access Memory (SRAM), Electrically Erasable Programmable Read-Only Memory (EEPROM), Hard Disk Drive (HDD), a Solid-State Drive (SSD), a CPU cache, a Secure Digital (SD) card, and/or a cache memory.

The image sensor 206 may comprise suitable logic, circuitry, interfaces, and/or code that may be configured to capture one or more images and/or videos within a field-of-view of the image sensor 206. The image sensor 206 may further generate visual representations of the captured one or more images and/or videos. The image sensor 206 may be configured to capture the one or more images and/or videos, via a lens assembly at the second end 104b of the imaging device 104. The image sensor 206 may be implemented by use of a charge-coupled device (CCD) technology or complementary metal-oxide-semiconductor (CMOS) technology.

The transceiver 208 may comprise suitable logic, circuitry, interfaces, and/or code that may be configured transmit/receive commands, information, and/or images to other devices, via the communication network 114. The transceiver 208 may include, but is not limited to, an antenna, a radio frequency (RF) transceiver, one or more amplifiers, one or more oscillators, a digital signal processor, a coder-decoder (CODEC) chipset, a subscriber identity module (SIM) card, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global Systems for Mobile Communications (GSM), Enhanced Data GSM Environment (EDGE), wideband code division multiple access (VV-CDMA), code division multiple access (CDMA), time division multiple access (TDMA), Bluetooth, Light Fidelity(li-Fi), Wireless Fidelity (Wi-Fi) (IEEE 802.11a, IEEE 802.11b, IEEE 802.11g and/or IEEE 802.11n), voice over internet Protocol (VoIP), Wi-MAX.

In operation, the transceiver 208 may be configured to receive the first control instruction from the electronic device 106, under the control of the processor 202. The first control instruction may be received via the communication network 114. The first control instruction may correspond to the one or more commands. The processor 202 may be further configured to activate the image sensor 206 to capture one or more images and/or one or more video streams underneath the watercraft 102. The capture of the one or more images and/or one or more video streams may occur in response to the received first control instruction. The first control instruction may include control instructions to change a capture mode, a focal length, and/or one or more other camera parameters of the imaging device 104.

In accordance with an embodiment, the processor 202 may be further configured to receive a second control instruction from the electronic device 106. The second control instruction may correspond to the received one or more commands. The second control instruction may include movement instructions for mechanical movement of the imaging device 104. The mechanical movement of the imaging device 104 may change an orientation of the imaging device 104, which may change direction of a field-of-view of the it imaging device 104.

In accordance with the an embodiment, the processor 202 may be configured to capture the one or more images and one or more video streams, by use of the image sensor 206. The processor 202 may be further configured to temporally store the captured one or more images and one or more video streams in the memory 204. The processor 202 may be further configured to communicate the captured one or more images or video streams to the electronic device 106, via the transceiver 208. The transceiver 208 may be provided in the first end 104a of the imaging device 104.

In accordance with an embodiment, a depth sensor (not shown) may be provided in the recess 108b to determine a depth information underneath the watercraft 102. The processor 202 may be configured to receive the depth information from the depth sensor. The processor 202 may be configured to store the depth information in the memory 204. In accordance with an embodiment, the processor 202 may be further configured to periodically communicate the depth information to the electronic device 106, via transceiver 208.

Figure 3:
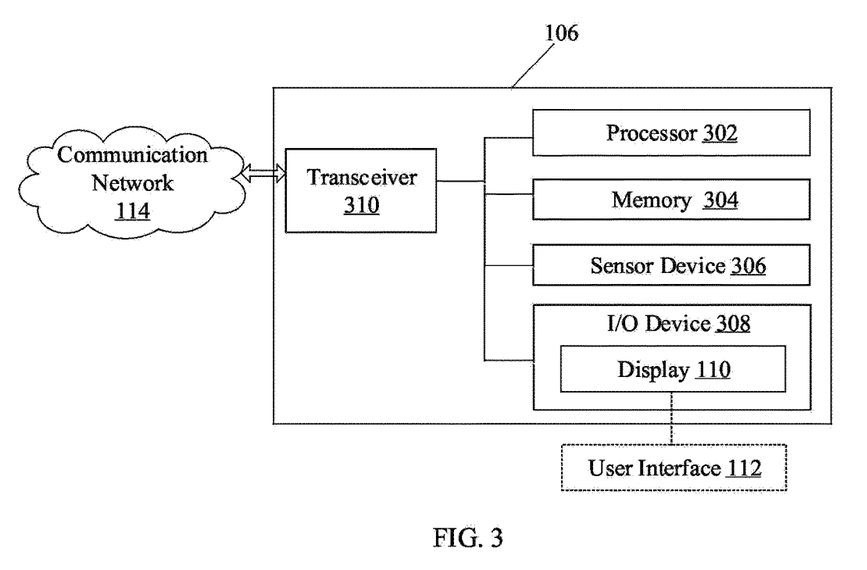
FIG. 3 is a block diagram that illustrates an exemplary electronic device, in accordance with an embodiment of the disclosure.

FIG. 3 is a block diagram illustrating an exemplary electronic device, in accordance with embodiment of the disclosure. FIG. 3 is explained in conjunction with elements from FIG. 1A through 1E, and FIG. 2. With reference to the FIG. 3, there is shown the electronic device 106. The electronic device 106 may include a processor 302, a memory 304, a sensor device 306, an input/output (I/O) device 308, and a transceiver 310. The I/O device may include the display 110, which may render the UI 112. The processor 302 may be communicatively coupled to the memory 304, the sensor device 306, the I/O device 308, and the transceiver 310.

In accordance with an embodiment, implementation examples of the processor 302, the memory 304, and the transceiver 310, may be similar to the processor 302, the memory 204, and the transceiver 208, respectively (FIG. 2.). The sensor device 306 may comprise suitable logic, circuitry, interfaces, and/or code that may be configured to detect events or changes in the environment of the user 118, and provide corresponding output. Examples of the sensor device 306 may correspond to, but are not limited to, a GPS sensor, a proximity sensor, a touch sensor, and/or an infrared sensor.

The I/O device 308 may comprise suitable logic, circuitry, interfaces, and/or code that may be configured to receive an input from the user 118, or provide an output to the user 118. The I/O device 308 may comprise various input and output devices that may be operable to communicate with the processor 302. Examples of the input devices may include, but are not limited to, a joystick, a touch screen, a microphone, a camera, a motion sensor, a light sensor, and/or a docking station. Examples of the output devices may include, but are not limited to, the display 110 and/or a speaker.

In operation, the processor 302 may be configured to receive an input from the user 118. The input may correspond to one or more commands to remotely control the imaging device 104. The processor 302 may be configured to communicate the received input to the imaging device 104, via the transceiver 310. The processor 302 may communicate a first control instruction event to the imaging device 104, to enable control of the capture mode, the focal length, and the other camera parameters of the imaging device 104.

In accordance with an embodiment, the processor 302 may be configured to communicate a second control instruction to the imaging device 104. The second control instruction may be communicated to control mechanical movement of the imaging device 104. The processor 302 may be further configured to communicate one or more commands to the imaging device 104, to capture one or more images and/or one or more video streams underneath the watercraft 102.

In accordance with an embodiment, the processor 302 may be configured to receive the captured one or more images or a live video stream from the imaging device 104, via transceiver 310. The processor 302 may be further configured to process the received one or more images or the video streams. The processor 302 may be further configured to control display of the one or more images or the live video stream on the display 110, via the UI 212. The processor 302 may be further configured to store the received one or more images or the received live video stream in the memory 304.

In accordance with an embodiment, the processor 302 may be further configured to detect a scene-of-interest from the received live video stream from the imaging device 104. The scene-of-interest may be based on the preset user preferences. Various images with different camera parameters may be automatically captured for the detected scene-of-interest. In instances when the capture mode of the imaging device 104 may be image capture mode, the capture mode may change to record a video of the detected scene-of-interest.

In accordance with an embodiment, the processor 302 may be configured to dynamically generate a digital souvenir. The processor 302 may be further configured to generate the digital souvenir from the one or more images and one or more video streams stored in the memory 304. The processor 302 may be further configured to arrange the captured one or more images in the digital souvenir, based on the time-of-capture and the location-of-capture of the one or more images. The processor 302 may be further configured to arrange the capture of one or more images in the digital souvenir, based on a sequence-of-capture and a time-of-day during the capture. The one or more images may be arranged in the digital souvenir, based on the quality parameter, and/or the detected scene-of-interest in the one or more images. The processor 302 may be further configured to generate the digital souvenir, based on a movement profile of the watercraft 102.

In accordance with an embodiment, the processor 302 may be further configured to control display of the generated souvenir on the display 110, via the UI 212. The processor 302 may be further configured to communicate the generated digital souvenir to one or more other electronic devices of other watercrafts in vicinity, via the transceiver 310. Further, the generated digital souvenir may be communicated in real time or near real time, to a remote device for remote display of the underwater creatures.

In accordance with an embodiment, the sensor device 306 may be configured to detect an abnormality or abnormalities in the health condition of the user 118. The abnormality or abnormalities in the heath condition of the user 118 may be detected based on sensor data received from one or more wearable devices, such as the wearable device 116, communicatively coupled to the electronic device 106. The processor 302 may be further configured to generate an alert based on the detected health abnormality or abnormalities data of the user 118. The processor 302 may be further configured to broadcast the alert to one or more other electronic devices of one or more other watercrafts in vicinity of the watercraft 102, or to the remote device.

In accordance with an embodiment, the processor 302 may receive the geographical location information of the water-craft 102 from the sensor device 306. The processor 302 may be further configured to periodically update the geographical location of the watercraft 102. The processor 302 may be further configured to utilize the geographical location information for the creation of the movement profile of the watercraft 102. The processor 302 may be further configured to communicate the geographical location information to one or more other electronic devices of one or more other watercrafts in vicinity of the watercraft 102, via transceiver 310.

Figure 4:
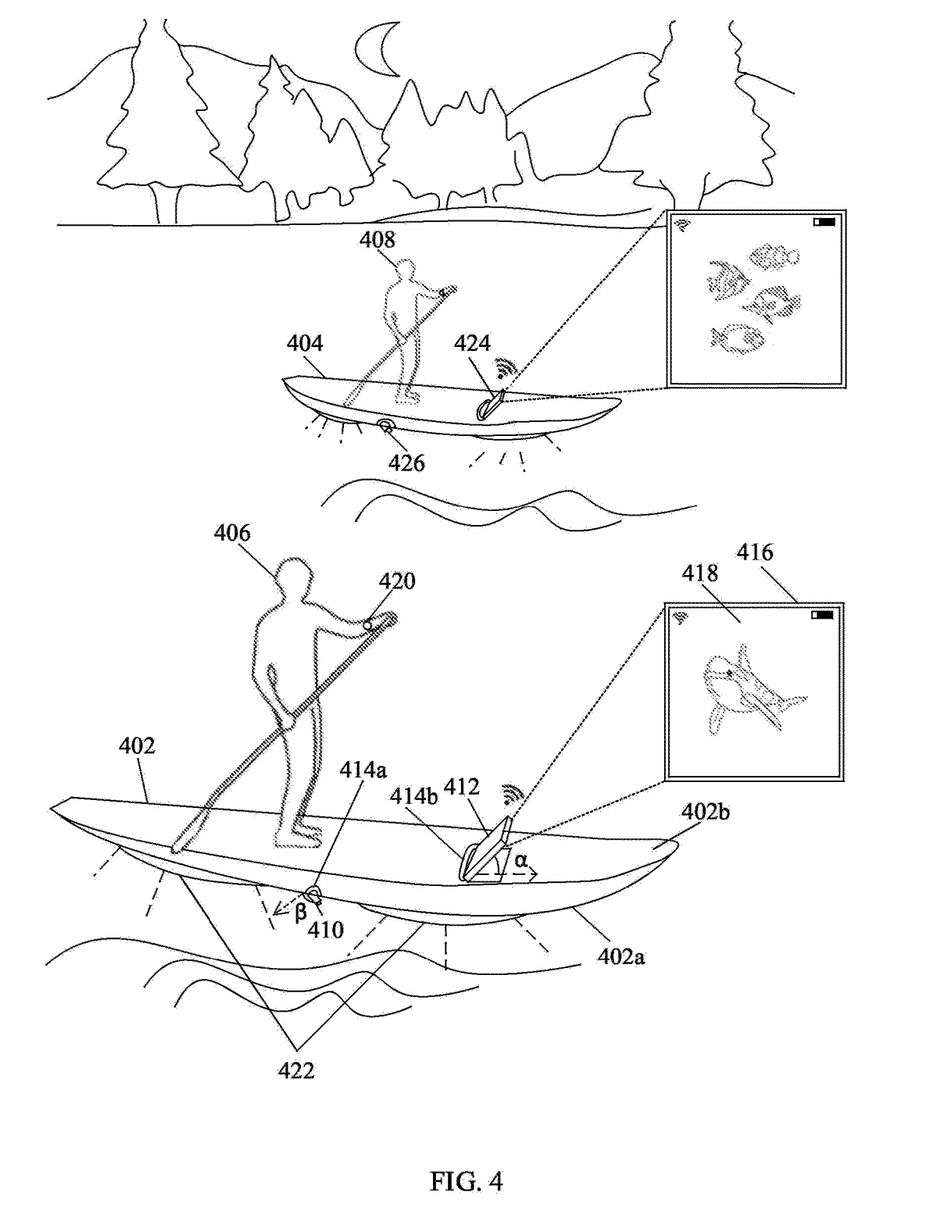
FIG. 4 illustrates an exemplary scenario for implementation of a controllable imaging device in an exemplary stand-up paddle board, in accordance with an embodiment of the disclosure.

FIG. 4 illustrates an exemplary scenario for implementation of a controllable imaging device in an exemplary stand-up paddle board, in accordance with an embodiment of the disclosure. FIG. 4 is described in conjunction with elements from FIGS. 1A to 1E, 2, and 3. With reference to FIG. 4, there is shown one or more stand-up paddle boards (SUPs), such as a first SUP 402 and a second SUP 404, and one or more suffers, such as first surfer 406, and a second surfer 408. The first SUP 402 may include an action cam 410, an electronic device 412, a first recess 414a at the lower surface of the first SUP 402, and a second recess 414b at the upper surface of the first SUP 402. There is further shown a display 416, a UI 418, a smart-watch 420, and one or more light straps 422. The UI 418 may be rendered on the display 416. The second SUP 404 may include another electronic device 424 and another action cam 426.

In accordance with the exemplary scenario, the one or more surfers may be tourists performing the SUP-based watersport activity in the dark. The first SUP 402 and the second SUP 404 may correspond to the watercraft 102. The action cam 410 may correspond to the imaging device 104. The electronic device 412 may correspond to the electronic device 106. The first recess 414a and the second recess 414b may correspond to the recess 108b and the recess 108a, respectively. The display 416 may correspond to the display 110. The UI 418 may correspond to the UI 112. The smart-watch 420 may correspond to the wearable device 116. The one or more light straps 422 may correspond to the one or more light straps 120. The other electronic device 424 may be similar to the electronic device 106.

In accordance with the exemplary scenario, the first surfer 406 and the second surfer 408 may perform a water sport in the dark. The one or more light straps 422 may be powered on to provide light to enable capture of one or more images by the action cam 410, underneath the first SUP 402 during night time. In accordance with an embodiment, the first surfer 406 may adjust the tilt of the electronic device 412 manually with respect to the first surfer 406 at angle "α". In accordance with an embodiment, the tilt of the electronic device 412 may be further adjusted based on a control command received from the smart-watch 420.

In accordance with an embodiment, the action cam 410 may be positioned within the first recess 114a, such that the action cam 410 may be partially submerged in water when the first SUP 402 moves on water. A first end of the action cam 410, which may include a transceiver circuit, such as the transceiver 208, may not be submerged in the water when the first SUP 402 moves on water.

The smart-watch 420 may be configured to receive an input to control the mechanical movement of the action cam 410, and/or initiate control capture of a video or image by the action cam 410. The control of movement may be similar to the controlled movement of the imaging device 104, as described previously in FIG. 1D. The action cam 410 may communicate the one or more live images or videos to the electronic device 412. The electronic device 412 may be configured to control display of the captured videos or images on the display 416 via the UI 418.

The electronic device 412 may be configured to exchange or swap display of the captured underwater view underneath the first SUP 402 with the second SUP 404. Accordingly the first surfer 406 may visualize underwater view underneath various SUPs in the vicinity of the first SUP 402. The electronic device 412 may be configured to display graphical icons, each with a unique identifier that may indicate various connected SUPS, such as the second SUP 404, in the vicinity of the first SUP 402. For example, the unique identifier may be a number or a name of the other surfers, pre-configured and pre-associated with the various connected SUPs. A simple voice-based input, such as calling out a specific number or name, may be captured by the smart-watch 420. The smart-watch 420 may then communicate the unique identifier to the electronic device 412, to enable selection of the icon of the specific SUP. This may initiate rendering of underwater view captured by the other action cam 426, of the selected SUP, on the display 416 associated with the first SUP 402.

In accordance with an embodiment, a health alert related to the first surfer 406 may be communicated to the one or more other electronic devices, such as the electronic device 424 of the second SUP 404, in the vicinity of the first SUP 402. Thus, the one or more surfers may efficiently maneuver the SUPs, without missing interesting moments or view of one or more underwater objects during the watersport. An unabated or seamless experience may be provided to the one or more surfers during performance of the watersport-related activities.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system, such that it carries out the methods described herein.

The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. The computer program, in the present context, means any expression, in any language, code, or notation, of a set of instructions intended to cause a system with an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A watercraft comprising:
   a rotatable housing provided in a recess located underneath said watercraft;
   a roller assembly positioned within said recess to movably engage said rotatable housing within said recess; and
   an imaging device positioned within said rotatable housing, wherein one or more circuits in said imaging device receives one or more control commands from an electronic device to enable capture of one or more images.

2. The watercraft according to claim 1, wherein said watercraft corresponds to one of: a stand-up paddle board, a surfboard, a kayak, a jet ski, a boat, and/or other watercrafts.

3. The watercraft according to claim 1, wherein said imaging device is positioned within said rotatable housing such that said imaging device is partially submerged in water when said watercraft moves on said water.

4. The watercraft according to claim 1, wherein said imaging device comprises said one or more circuits at a first end and one or more optical lenses at a second end of said imaging device, wherein said one or more circuits are positioned above water level and said one or more optical lenses remain submerged in water when said watercraft moves on said water.

5. The watercraft according to claim 1, wherein said electronic device corresponds to one of: a tablet computer, a wearable device, a smartphone, a display device, and/or other electronic devices.

6. The watercraft according to claim 1, further comprises another recess provided in an upper surface of said watercraft, wherein said electronic device is movably attached to said other recess using a fastener.

7. The watercraft according to claim 1, wherein said one or more circuits in said imaging device are further configured to capture said one or more images and/or one or more video streams of one or more views underneath said watercraft in one or more directions, based on said received one or more control commands from said electronic device.

8. The watercraft according to claim 7, wherein said one or more circuits in said imaging device are further configured to communicate said captured one or more images and/or said video streams to said electronic device or another electronic device, via a wireless communication channel.

9. The watercraft according to claim 1, wherein one or more circuits in said electronic device are further configured to detect a scene-of-interest from a live video streamed from said imaging device based on present user-preferences, wherein said one or more circuits in said imaging device are further configured to receive said one or more control commands for said capture of one or more images of said detected scene-of-interest or to record a video of said detected scene-of-interest.

10. The watercraft according to claim 1, wherein one or more circuits in said electronic device are further configured to control display of a live video streamed from said imaging device, wherein said one or more control commands are communicated for said capture of one or more images based on a user input.

11. The watercraft according to claim 1, further comprising one or more light straps removably attached to an outer surface underneath said watercraft to provide underwater light, wherein said one or more light straps, said imaging device, and said electronic device are powered by a battery.

12. The watercraft according to claim 1, wherein said rotatable housing is floatable, and a watertight transparent housing.

13. The watercraft according to claim 1, wherein one or more circuits in said electronic device are further configured to communicate with one or more other electronic devices of one or more other watercrafts in vicinity of said watercraft.

14. The watercraft according to claim 1, wherein one or more circuits in said electronic device are further configured to communicate a first control instruction, which corresponds to said one or more commands, to said one of more circuits in said imaging device, wherein said first control instruction is communicated to enable control of one or more of: a capture mode, a focal length, and other camera parameters of said imaging device.

15. The watercraft according to claim 1, wherein one or more circuits in said electronic device are further configured to communicated a second control instruction, which corresponds to said one or more commands, to said one or more circuits in said imaging device, wherein said second control instruction is communicated to enable a mechanical movement of said imaging device to change a direction of a field-of view of said imaging device.

16. The watercraft according to claim 1, wherein one or more circuits in said electronic device are further configured to detect an abnormality in health condition of a user based on sensor data received from one or more wearable devices communicatively coupled to said electronic device.

17. The watercraft according to claim 1, wherein one or more circuits in said electronic device are further configured to communicate an alert to one or more other electronic devices of one or more other watercrafts in a vicinity of said watercraft based on said detected abnormality.

18. The watercraft according to claim 1, wherein one or more circuits in said electronic device are further configured to generate a digital souvenir based on said captured one or more images.

19. The watercraft according to claim 18, wherein one or more circuits in said electronic device are further configured to arrange said captured one or more images in said digital souvenir based on one or more of: a time-of-capture, a location-of-capture, a sequence-of-capture, a time-of-day during capture, a quality parameter, and/or detected scene-of-interest in said one or more images.

20. The watercraft according to claim 18, wherein one or more circuits in said electronic device are further configured to generate a digital souvenir based on said captured one or more images and a movement profile of said watercraft in a trip.

* * * * *